No. 701,890. Patented June 10, 1902.
P. KELLER.
CARBURETER.
(Application filed Aug. 13, 1900. Renewed Apr. 17, 1902.)

(No Model.)

Witnesses:
E. F. Wilson
Jno. J. Snowhook.

Inventor:
Peter Keller
By Rudolph M. Lotz
Attorney.

UNITED STATES PATENT OFFICE.

PETER KELLER, OF CHICAGO, ILLINOIS, ASSIGNOR, BY MESNE ASSIGNMENTS, OF ONE-HALF TO WILLIAM A. BECK, OF CHICAGO, ILLINOIS.

CARBURETER.

SPECIFICATION forming part of Letters Patent No. 701,890, dated June 10, 1902.

Application filed August 13, 1900. Renewed April 17, 1902. Serial No. 103,431. (No model.)

*To all whom it may concern:*

Be it known that I, PETER KELLER, a citizen of the United States, residing at Chicago, in the county of Cook and State of Illinois, have invented certain new and useful Improvements in Carbureters; and I do hereby declare the following to be a full, clear, and exact description of the invention, such as will enable others skilled in the art to which it appertains to make and use the same.

My invention relates to an improved form of carbureter for producing illuminating gas by the use of a hydrocarbon liquid, the object being to make a carbureter which will produce gas free from impurities, which can be easily filled, and which will be of convenient form to manufacture; and it consists in the features of construction and combinations of parts hereinafter fully described and claimed.

Figure 1:
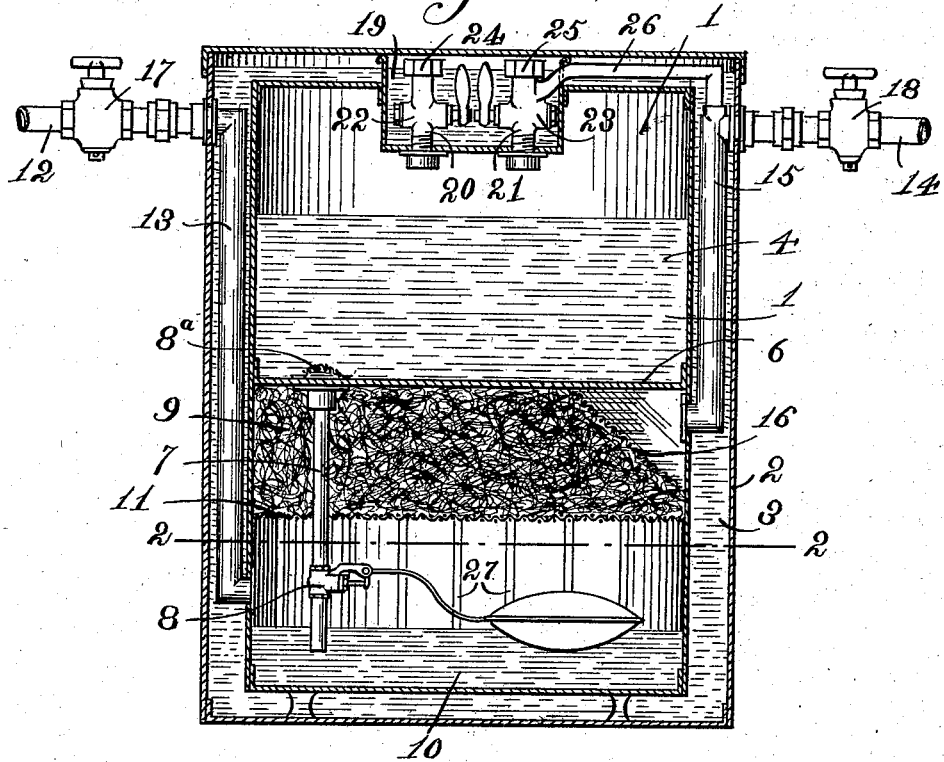
Figure 2:
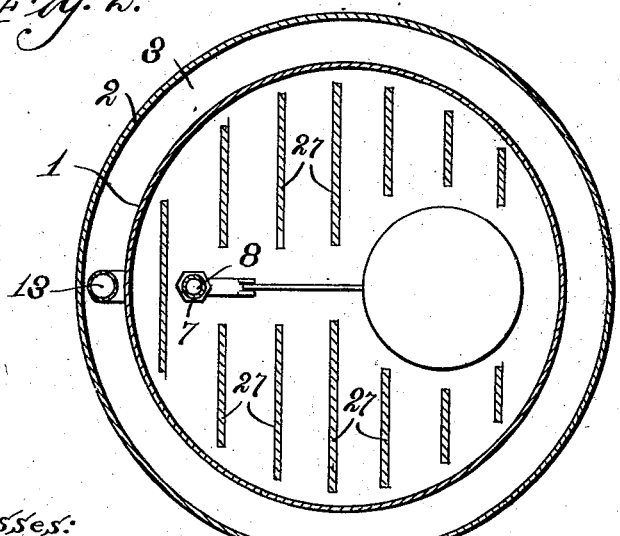

In the accompanying drawings, illustrating my invention, Figure 1 is a vertical section of a carbureter made in accordance with my invention. Fig. 2 is a horizontal section on line 2 2 of Fig. 1.

My device consists of an inner cylindrical vessel 1, surrounded by an outer vessel 2 of similar shape, from which it is separated by the space 3, said space being designed to be filled with water for cooling purposes. Said vessel 1 is divided into two main compartments 4 and 5 by the horizontal partition 6, the upper compartment 4 being a storage-space for the liquid used in the carbureter and said lower compartment 5 being designed for a mixing-chamber. The storage-chamber 4 is connected to the mixing-chamber 5 by means of the dependent pipe 7, the flow of liquid through same being controlled by means of the float-valve 8, which is designed to maintain a predetermined level of the liquid in said mixing-chamber 5. The upper end of said pipe 7 is protected by the wire screen 8ᵃ to prevent any extraneous particles from finding their way into said mixing-chamber. The lower end of said pipe 7 extends to near the bottom of said chamber 5 and ends below the surface of the liquid as maintained by the float-valve 8. The upper portion 9 of said mixing-chamber 5 is separated from the lower portion 10 of same by the foraminated horizontal partition 11 and is designed to contain cotton or other fibrous material for the purpose of preventing any liquid particles of the liquid from being carried out of the carbureter along with the mixed gases. The lower portion 10 of said mixing-chamber 5 is connected to the inlet-pipe 12 by the pipe 13, which enters through the wall of the outer vessel 2, near its top edge, thence passes downward in the space 3 and enters said chamber 10 a little above the level of the liquid therein. The upper portion 9 of said mixing-chamber is connected to the delivery-pipe 14 by the pipe 15, which enters said outer vessel 2 on a level with and diametrically opposite to said inlet-pipe 12, thence passes downward through the space 3 and enters said chamber 9 near its upper wall. To prevent said cotton in chamber 9 from stopping the orifice of said pipe 15, a wire screen 16 is placed in said chamber so as to leave a clear space in front of said orifice. Said inlet and delivery pipes 12 and 14 are supplied with valves 17 and 18 for controlling the flow of gases therein. A small chamber 19 is provided in the upper portion of said storage-chamber 4, adapted to contain the filling-tube 20 and vent-tube 21, each of which is provided with a stop-cock 22 and 23 and screw-cap 24 and 25, respectively. Said vent-tube 21 is connected by means of the pipe 26 to the delivery-pipe 15, forming a by-pass for the purpose of equalizing the pressure in the two chambers 4 and 5.

In operating my carbureter air or other gases are forced through the inlet-pipe to the mixing-chamber, where it will take up the vapors of the hydrocarbon liquid contained therein, the thorough saturation of the gases being helped by the absorbent wicks 27, which depend from the foraminated partition 11, the lower ends of which hang in the liquid in said chamber 5. As the liquid in said chamber 5 is absorbed and carried away said float-valve 8 operates to allow more liquid to flow from said storage-chamber 4 to take its place. The gases after being thoroughly saturated with the vapor of the hydrocarbon liquid in said chamber 5 pass upward through said foraminated partition 11 and thence through the cotton contained in said chamber 9 and out through said delivery-pipe 14.

I am enabled to produce a very steady flow of evenly-mixed gases by means of this form of carbureter.

I claim as my invention—

A carbureter comprising a cylinder divided into three chambers by means of horizontal partitions, one of which is solid and one foraminated, the upper and lowermost chambers being adapted to contain naphtha and communicating with each other through a vertical pipe extending from the bottom of the upper chamber to a point adjacent the bottom of the lowermost chamber, a valve in said pipe controlled by a float for maintaining a given level in said lowermost chamber, a filter at the upper end of said pipe, filtering material filling the intermediate chamber and resting upon said foraminated partition, a gas-chamber formed in said intermediate chamber and communicating with said lowermost chamber through said filtering material only, a gas-inlet into said lowermost chamber, wicks of absorbent material depending from said foraminated partition into said naphtha in said lowermost chamber and adapted to increase the evaporating-surface therein, a gas-outlet from said gas-chamber in said intermediate chamber, and means for filling said upper chamber, substantially as described.

In testimony whereof I affix my signature in presence of two witnesses.

PETER KELLER.

Witnesses:
E. F. WILSON,
RUDOLPH WM. LOTZ.